J. F. SCHMIDT.
RAILROAD SWITCH.
APPLICATION FILED DEC. 16, 1908.
949,964.
Patented Feb. 22, 1910.
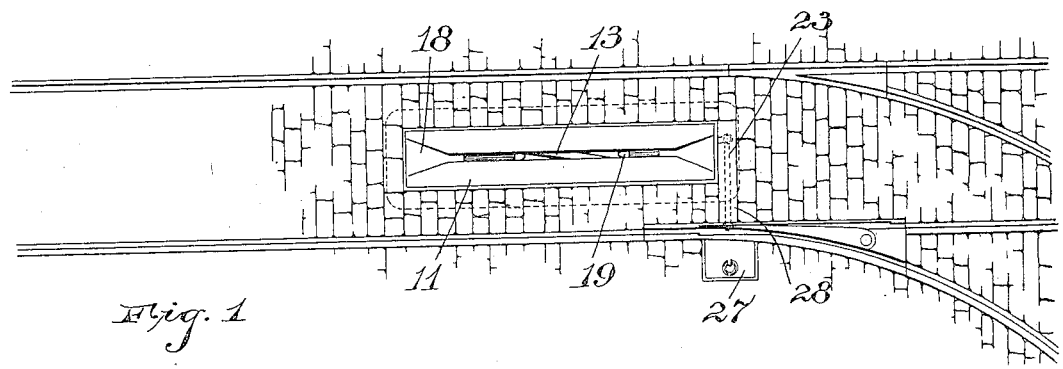
Fig. 1
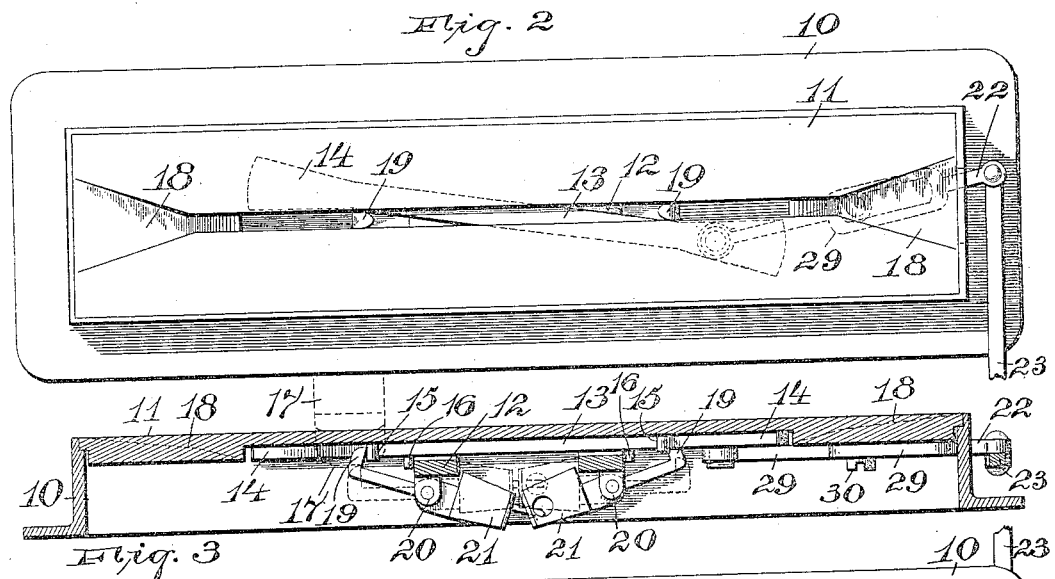
Fig. 2
Fig. 3
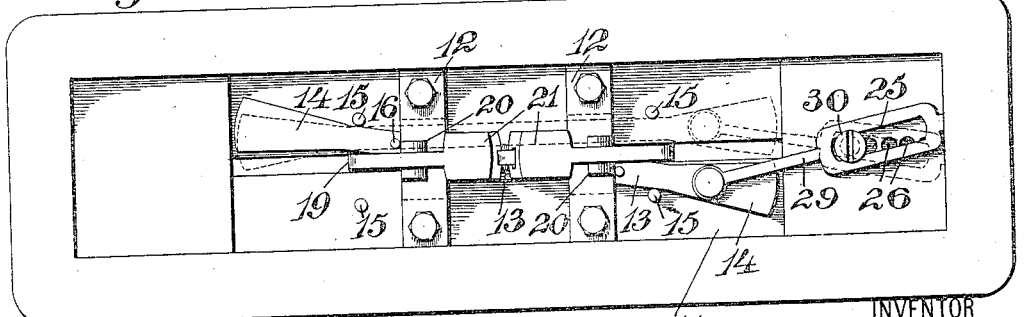
WITNESSES:
E. A. Peel
M. Johnson
Fig. 4
INVENTOR
Joseph F. Schmidt,
BY
Wm. H. Canfield.
ATTORNEY

UNITED STATES PATENT OFFICE.

JOSEPH F. SCHMIDT, OF NEWARK, NEW JERSEY.

RAILROAD-SWITCH.

949,964.   Specification of Letters Patent.   Patented Feb. 22, 1910.

Application filed December 16, 1908.   Serial No. 467,779.

*To all whom it may concern:*

Be it known that I, JOSEPH F. SCHMIDT, a citizen of the United States, residing at Newark, in the county of Essex and State of New Jersey, have invented certain new and useful Improvements in Railroad-Switches; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a mechanism for operating a switch from a moving car, so that by the operation of the same mechanism, the switch-tongue is thrown alternately open and shut.

The device comprises a casing adapted to be placed adjacent to the tracks, and preferably between them, and having means connected with the switch. The casing contains a mechanism that is alternately operated from side to side and having means for locking it in its opposite positions. The device is also designed to be unlocked simultaneously with its manipulation, preferably by the same tool, and adapted to automatically lock when the manipulation is completed.

Another feature is a connection from the operating mechanism to the switch by means of which the throw of the switch-tongue can be regulated.

The invention is illustrated in the accompanying drawing, in which—

Figure 1 is a plan of a switch with the operating mechanism in place. Fig. 2 is a top view. Fig. 3 is a section of Fig. 2, showing the movable parts in elevation and Fig. 4 is a bottom view.

The device consists of a casing or support consisting of a frame 10 into which fits the lid 11 so that the casing presents a flat surface, although the particular form of the casing is not essential. The top of the lid is preferably roughened. A pair of plates 12 are secured in the casing, preferably to the lid, these plates acting to bridge and confine a lever 13 against the under side of the lid. The lever has its two side edges formed parallel in the center, and the ends are provided with wings 14 which supply cam surfaces 14$^a$ having functions to be described hereinafter. Four pins 15 are arranged so that a pair flanks the lever 13, near each end thereof, at a point about where the wings begin. The lever has a free lateral movement when operated, and swings against the pins which act as fulcrums. Pins 16 or the like are designed to prevent longitudinal movement of the lever 13. The lid 11 is provided with a slot for the entrance of a tool for operating the lever and the latches to be described hereinafter. The lever is normally arranged diagonally across the slot and rests against opposite pins on opposite ends of the lever as in Fig. 4.

The tool 17 is operated from a car, and when the motorman observes the switch and it is not set for the direction in which he desires to go, he drops the tool which enters the flaring and inclined entrance 18 of the slot, and travels along the slot until it engages a nose or latch 19 which is in duplicate at each side of the center of the slot and which have a tendency to remain in position, bearing against the opposite sides of the lever and locking it as in the drawing. The latches are preferably pivoted to the bearings 20 on the plates or bridges 12 and are connected with the weights 21, or their equivalents, and these weights in turn are connected so that when one latch is operated the other one is also. When one latch is depressed by the tool, the other one is also and the lever is released. The tool passes longitudinally along one edge of the lever and causes the lever to swing against the pin it rested against and which is now in rear of the tool. The tool swings the lever to the dotted position in Fig. 4, assuming the lever to have been in the position shown in full lines in said figure, the latches being held open by the lever passing over one in this operation. The wings now project across the slot and the tool now engages the one on the end opposite to the direction from which the car came and causes the lever to swing on a pin 15 adjacent to said wing, and again places the lever diagonally across the casing and the slot, but diagonally opposite to its previous position. As the tool leaves the lever it causes the latches to be released and the lever is locked. The lever 13 is connected to the switch-tongue and swings it open and shut as the lever is operated.

The preferred form of connection between the lever and switch-tongue comprises an arm 29 pivoted at one end to one end of the lever swinging on a pivot 30 and connected at its free end 22 by means of a link 23 to the switch-tongue 24. I prefer to provide the arm 29 with a slot 25 in which the pivot 30 fits. The casing can be supplied with holes 26 as in Fig. 4, so that the pivot can be changed to vary the throw of the arm and consequently the switch-tongue. A suitable cover 27, Fig. 1, can be provided to permit a ready cleaning of the switch and its connecting mechanism.

The locking of the apparatus positively prevents a car from having its front trucks go on one set of tracks and the rear trucks on another. A tube or casing 28 protects the link 23 and prevents interference therewith.

The particular structure herein described can be changed to meet varying conditions without departing from the scope of the invention. One of the main advantages of this construction over a lever pivoted to a fixed pivot on one end, is the location of but one tool at the same point on all cars, so that but one lever or similar mechanism has to be operated by the motorman, and only when the switch is not as desired. The switch can be operated in either direction, and the lever swinging alternately on its opposite ends, when operated, forms a structure that is simple and not apt to get out of order.

Having thus described my invention, what I claim is:—

1. A switch-operating device comprising a casing having a slot therein, a lever in the casing, a bridge supporting the lever, means for preventing longitudinal movement of the lever, a pair of fulcrums on each side of the slot and at each end of the lever, latches pivoted on the bridge, means for causing the latches to engage the lever, and means for insuring the simultaneous operation of the latches.

2. A switch-operating device comprising a casing having a slot therein, a lever under the slot, a bridge supporting the lever, a pair of fulcrums on each side of the slot and at each end of the lever, pivoted latches on the bridge having means for normally engaging the lever, weights on the latches, and a connection between the weights to cause them to act together.

3. A switch-operating device comprising a casing having a slot in its top, a lever under the slot, bridges supporting the lever, pins in the casing and adapted to act as fulcrums on both sides of each end of the lever, weighted latches pivoted on the bridges and acting to lock the lever, and a connection between the latches to cause them to act together.

4. A switch-operating device comprising a casing, a lid on the casing, the lid having a slot with inclined and flaring ends, a lever under the lid, bridges supporting the lever, a pair of pins on the lid on each side of the lever and at each end thereof, a pivoted weighted lever on the bridge, means connecting the levers for causing them to act together, and a connection from the lever to a switch-tongue.

5. A switch-operating device comprising a lever mounted on a support and adapted to swing, a slotted arm fulcrumed on the support and having one end pivotally connected with the lever, a pivotal pin having means for adjusting it on the support and along the slot of the arm, whereby the throw of the arm can be regulated, and a connection between the free end of the arm and a switch-tongue.

6. A switch-operating device comprising a support, a lever adapted to swing on the support, the support having a series of perforations therein, a pivotal pin adapted to fit the perforations, a slotted arm fulcrumed on the pivotal pin and having one end pivotally connected with the lever, and an operative connection between the free end of the arm and a switch-tongue.

7. A switch-operating device comprising a casing, a lever on the casing, means for locking the lever in oppositely diagonal positions, an arm fulcrumed on the casing, an adjustable fulcrum for the arm, one end of the arm being pivotally secured to the lever, and means connecting the free end of the arm with a switch-tongue.

8. A switch-operating device comprising a casing, a lever on the casing, means for locking the lever in oppositely diagonal positions, a series of perforations in the casing, a pivotal pin adapted to enter the perforations, an arm having a slot therein and fulcrumed on the pivotal pin, one end of the arm being pivotally connected with the lever, and means connecting the free end of the arm with a switch-tongue.

9. A switch-operating device comprising a support, a lever on the support, means for preventing longitudinal movement of the lever, fulcrums so disposed that the lever can be operated alternately on its opposite ends at each operation, an arm having one end pivotally connected with the lever, a connection between the free end of the lever and a switch-tongue, and an adjustable fulcrum for the arm.

10. A switch-operating device comprising a support, a lever on the support, means for preventing longitudinal movement of the lever, fulcrums so disposed that the lever can be swung alternately on its opposite ends at each operation, a slotted arm on the support having one end pivotally secured to the lever, a casing having a series of perforations therein, a pivotal pin adapted to enter the slot in the arm and the perforations in the casing, and a connection between the free end of the lever and a switch-tongue.

In testimony, that I claim the foregoing, I have hereunto set my hand this 15th day of December 1908.

JOSEPH F. SCHMIDT.

Witnesses:
E. A. PELL,
WM. H. CAMFIELD.